US009554027B2

United States Patent
Wu et al.

(10) Patent No.: US 9,554,027 B2
(45) Date of Patent: Jan. 24, 2017

(54) ELECTRONIC SYSTEM FOR PROCESSING MULTIMEDIA INFORMATION

(71) Applicant: HTC Corporation, Taoyuan County (TW)

(72) Inventors: Jenn-Wein Wu, Taoyuan County (TW); Chien-Chuan Chang, Taoyuan County (TW); Yung-Chao Tseng, Taoyuan County (TW); Hsin-Ti Chueh, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 41 days.

(21) Appl. No.: 14/521,454

(22) Filed: Oct. 22, 2014

(65) Prior Publication Data

US 2015/0381874 A1   Dec. 31, 2015

Related U.S. Application Data

(60) Provisional application No. 62/017,850, filed on Jun. 27, 2014.

(51) Int. Cl.
*H04N 5/232* (2006.01)
*H04N 1/21* (2006.01)

(52) U.S. Cl.
CPC ........ *H04N 5/23206* (2013.01); *H04N 1/2112* (2013.01); *H04N 5/23241* (2013.01)

(58) Field of Classification Search
CPC  H04N 5/23241; H04N 1/2112; H04N 5/2258; H04N 5/23206
See application file for complete search history.

(56) References Cited

U.S. PATENT DOCUMENTS 8,600,302 B2 * 12/2013 Yun ................... H04M 1/7253
455/41.2
2006/0174203 A1 * 8/2006 Jung ................... G06F 17/3028
715/751

(Continued)

FOREIGN PATENT DOCUMENTS

TW        200920093 A    5/2009
TW        201108724 A    3/2011

(Continued)

OTHER PUBLICATIONS

Corresponding Taiwanese Office Action that these art references were cited on Jan. 19, 2016.

*Primary Examiner* — Nicholas Giles
(74) *Attorney, Agent, or Firm* — CKC & Partners Co., Ltd.

(57) ABSTRACT

An electronic system includes a first electronic apparatus and a second electronic apparatus. The first electronic apparatus includes a first low-energy communication unit, a camera unit and a first control unit. The camera unit is configured for capturing multimedia files. The first control unit is configured for generating a plurality of metadata related to the multimedia files respectively. The second electronic apparatus includes a second low-energy communication unit and a second control unit. The second low-energy communication unit is configured for establishing a first wireless connection with the first low-energy communication unit, and receiving the metadata related to each of the multimedia files without receiving original contents of the multimedia files. The second control unit is coupled with the second low-energy communication unit. The second control unit is configured for classifying the metadata into at least one group.

18 Claims, 3 Drawing Sheets

(56) References Cited

U.S. PATENT DOCUMENTS

| | | | | |
|---|---|---|---|---|
| 2007/0115373 A1* | 5/2007 | Gallagher | G06F 17/30265 | 348/231.3 |
| 2008/0175379 A1* | 7/2008 | Hansen | H04L 63/061 | 380/44 |
| 2009/0027546 A1* | 1/2009 | Jung | H04N 1/40068 | 348/372 |
| 2009/0047991 A1* | 2/2009 | Elg | H04W 52/0293 | 455/552.1 |
| 2009/0066790 A1* | 3/2009 | Hammadou | G08B 13/19636 | 348/143 |
| 2011/0014868 A1* | 1/2011 | Yun | H04M 1/7253 | 455/41.2 |
| 2013/0178163 A1* | 7/2013 | Wang | H04W 4/008 | 455/41.2 |
| 2013/0278631 A1* | 10/2013 | Border | G02B 27/017 | 345/633 |
| 2013/0286223 A1 | 10/2013 | Latta et al. | | |
| 2014/0347478 A1* | 11/2014 | Cho | H04N 7/183 | 348/143 |
| 2015/0130960 A1* | 5/2015 | Minamino | H04N 5/23245 | 348/220.1 |

FOREIGN PATENT DOCUMENTS

| | | |
|---|---|---|
| TW | 201228394 A | 7/2012 |
| TW | 201330566 A | 7/2013 |
| TW | 201330621 A | 7/2013 |
| WO | 2013070639 A2 | 5/2013 |

\* cited by examiner

| | |
|---|---|
| 2014/3/4 13:10 | |
| 2014/3/2 15:20-18:35, City Hall, 30 images | G1 |
| 2014/3/2 18:40-21:10, Wall St., 15 images / 2 videos | G2 |
| 2014/3/2 21:30 to 23:15, Broadway, 18 images | G3 |
| 2014/3/3, 8:10 to 12:40, Broadway, 20 images / 8 videos | G4 |

142

NTF

FIG. 3

ELECTRONIC SYSTEM FOR PROCESSING MULTIMEDIA INFORMATION

CROSS-REFERENCE TO RELATED APPLICATION

This application claims the priority benefit of U.S. Provisional Application Ser. No. 62/017,850, filed Jun. 27, 2014, the full disclosures of which are incorporated herein by reference.

FIELD OF INVENTION

The disclosure relates to an electronic system for processing multimedia information. More particularly, the disclosure relates to how to processing multimedia information on electronic apparatuses within an electronic system.

BACKGROUND

Advanced digital devices (e.g., smart phones, PDAs) implement notification windows for showing the user about updated events, current statements, incoming phone calls, newly received data, etc.

For example, when a smart phone is wireless connected (e.g., over Wi-Fi) with a stand-alone camera, the user can manipulate the camera to capture images/videos, and the images/videos can be dynamically transmitted to the smart phone. It is better to show the user about the updates of incoming images/videos. However, the always-on Wi-Fi connection for transmitting the images/videos consumes a lot of energy. In addition, if the notification occurs every time when one new image/video is received, the user will receive too many notifications. The notifications frequently show-up are annoying and fail to provide further information between the incoming images/videos.

SUMMARY

An aspect of the disclosure is to provide an electronic system, which includes a first electronic apparatus and a second electronic apparatus. The first electronic apparatus includes a first low-energy communication unit, a camera unit and a first control unit. The camera unit is configured for capturing a plurality of multimedia files. The first control unit is coupled with the first low-energy communication unit and the camera unit. The first control unit is configured for generating a plurality of metadata related to the multimedia files respectively. The second electronic apparatus includes a second low-energy communication unit and a second control unit. The second low-energy communication unit is configured for establishing a first wireless connection with the first low-energy communication unit, and receiving the metadata related to each of the multimedia files without receiving original contents of the multimedia files. The second control unit is coupled with the second low-energy communication unit. The second control unit is configured for classifying the metadata into at least one group.

Another aspect of the disclosure is to provide a first electronic apparatus and a second electronic apparatus. The first electronic apparatus includes a first low-energy communication unit, a camera unit and a first control unit. The camera unit is configured for capturing a plurality of multimedia files. The first control unit is coupled with the first low-energy communication unit and the camera unit. The first control unit is configured for generating a plurality of metadata related to the multimedia files respectively, classifying the metadata into at least one group, and creating a group event corresponding to the at least one group. The second electronic apparatus includes a second low-energy communication unit and a second control unit. The second low-energy communication unit is configured for establishing a first wireless connection with the first low-energy communication unit, and receiving the group event comprising the metadata without original contents of the multimedia files. The second control unit is coupled with the second low-energy communication unit. The second control unit configured for classifying the metadata into at least one group.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 is a schematic diagram illustrating a notification shown on a display unit of one electronic apparatus according to an embodiment of this disclosure.

DETAILED DESCRIPTION

Figure 1:
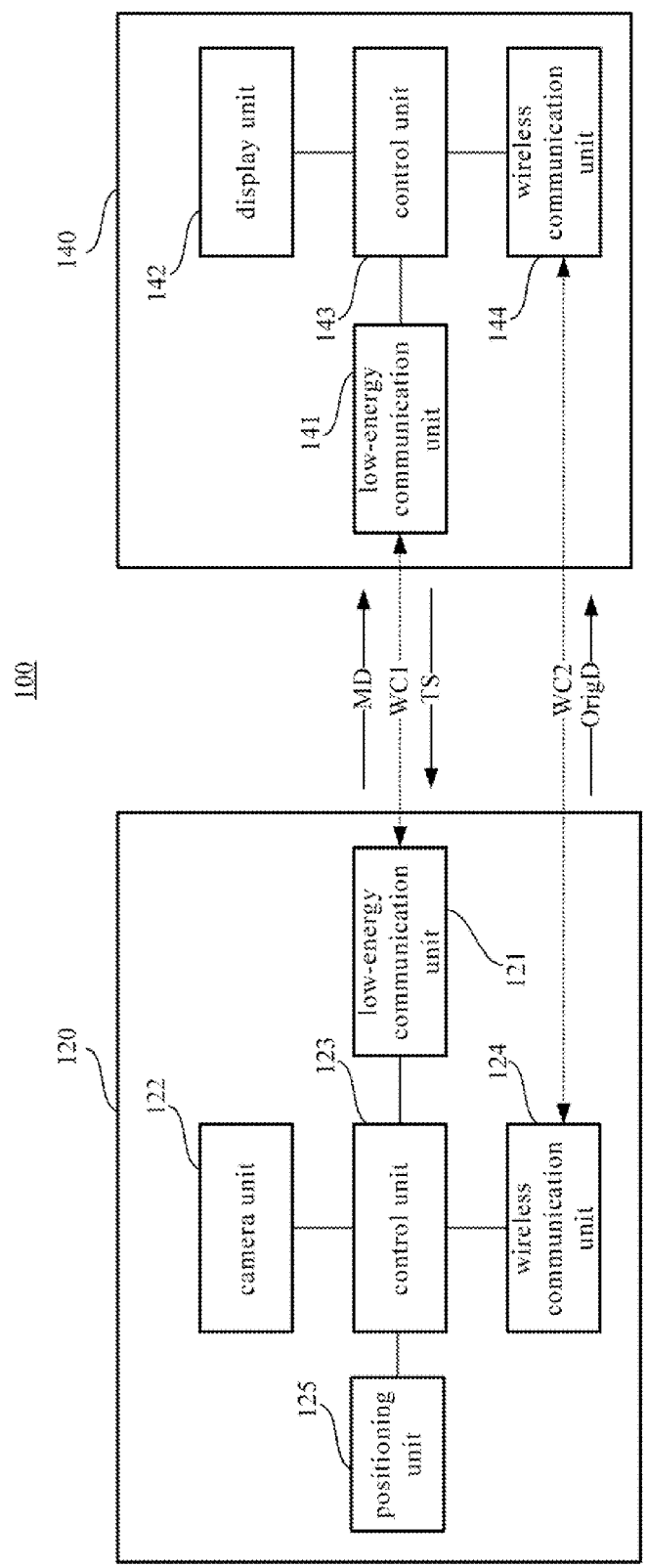
FIG. 1 is a schematic diagram illustrating an electronic system according to an embodiment of this disclosure.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Reference is made to FIG. 1, which is a schematic diagram illustrating an electronic system 100 according to an embodiment of this disclosure. As shown in FIG. 1, the electronic system 100 includes an electronic apparatus 120 and another electronic apparatus 140.

As shown in FIG. 1, the electronic apparatus 120 includes a low-energy communication unit 121, a camera unit 122 and a control unit 123. In some embodiments, the electronic apparatus 120 further includes a wireless communication unit 124 and a positioning unit 125. In practical applications, the electronic apparatus 120 can be a stand-alone camera with wireless accessibility, an mobile accessory device cooperated with a smart phone, or any equivalent mobile device.

As shown in FIG. 1, the electronic apparatus 140 includes a low-energy communication unit 141, a display unit 142 and a control unit 143. In some embodiments, the electronic apparatus 140 further includes a wireless communication unit 144. In practical applications, the electronic apparatus 140 can be a mobile phone with wireless accessibility, a smart phone, or any equivalent mobile device.

In some embodiments, the electronic apparatus 120 can be an extensive camera, which is utilized to capture images/ videos with higher quality, with higher mobility, or from different visual angles than the electronic apparatus 140.

The low-energy communication unit 121 and the low-energy communication unit 141 are configured for establishing a first wireless connection WC1 between each other (i.e., between the electronic apparatus 120 and the electronic apparatus 140). In some embodiments, the low-energy communication units 121 and 141 are always turned on and wireless connected, while the electronic apparatus 120 and the electronic apparatus 140 are locating within an accessible range or the electronic apparatus 120 is utilized to capture images/videos.

In some embodiments, the low-energy communication units 121 and 141 are both Bluetooth Low Energy (BLE) transceivers. The BLE transceivers are operated at a relative low power level compared to traditional Bluetooth transceivers (e.g., Bluetooth 1.0/2.0/3.0/3.1 transceivers) or Wi-Fi. The BLE transceivers are capable of establishing a wireless connection (i.e., the first wireless connection WC1) at relatively low energy consumption for a long time. However, the first wireless connection WC1 established by the BLE transceivers has a relatively small bandwidth and a relatively slow transmission speed.

If the electronic apparatus 120 and the electronic apparatus 140 are away from each others (outside the accessible range of the BLE transceivers), the first wireless connection WC1 will be temporally disconnected. The first wireless connection WC1 will be reconnected once the electronic apparatus 120 and the electronic apparatus 140 are moved back into the accessible range.

The camera unit 122 of the electronic apparatus 120 is configured for capturing a plurality of multimedia files (e.g., still images, continuous images, animations, videos, etc). In some embodiment, the electronic apparatus 120, as an extensive camera, will share/update the information of the captured multimedia files to the electronic apparatus 140 over the first wireless connection WC1.

In some embodiments, information about the multimedia files captured by the electronic apparatus 120 (e.g., the extensive camera) is preferred to be displayed on the electronic apparatus 140 (e.g., the smart phone) to acknowledge the user about the images/videos taken so far. In general, original contents of the multimedia files, including High-Definition image, video files, audio files, RAW data of photos/videos, are not suitable to be transmitted over the first wireless connection WC1 established by the low-energy communication units 121 and 141.

In response to a multimedia file is captured by the camera unit 122, the control unit 123 is configured for generating metadata MD related to the multimedia file. The metadata MD includes related information about the multimedia file. In some embodiment, the metadata MD corresponding to one multimedia file include a timestamp when the multimedia file is captured, a location where the multimedia file is captured (the location can be represents by GPS coordinates obtained from the positioning unit 125), a filename, a file-size, a media type (e.g., image/animation/video), etc.

If the first wireless connection WC1 is connected during the camera unit 122 is capturing the multimedia files, the control unit 123 is configured for generating the metadata MD related to the multimedia files respectively and transmitting the metadata MD to the electronic apparatus 140 without transmitting original contents OrigD of the multimedia files.

The metadata MD only includes partial information corresponding to the multimedia files without including the original contents OrigD thereof, such that the file-sizes of the metadata MD are much smaller than the multimedia files and suitable to be transmitted over the first wireless connection WC1.

The low-energy communication unit 141 of the electronic apparatus 140 is configured for receiving the metadata MD related to each of the multimedia files without receiving original contents OrigD of the multimedia files.

The control unit 143 is coupled with the low-energy communication unit 141 and the display unit 142. The control unit 143 is configured for classifying the metadata MD corresponding to the multimedia files into at least one group. In response to the metadata MD are classified into the at least one group, the control unit 143 generates a notification describing the metadata MD group-by-group. The notification is displayed on the display unit 142.

Reference is also made to FIG. 3. FIG. 3 is a schematic diagram illustrating a notification NTF, which is shown on the display unit 142 of the electronic apparatus 140 according to an embodiment of this disclosure. The notification NTF includes a time period, a location region, a total file-size and a quantity of the multimedia files corresponding to each group (e.g., groups G1, G2, G3 and G4) of the metadata MD.

In practices, if the control unit 143 generates one notification every time when the electronic apparatus 140 receives metadata MD of one image/video from the electronic apparatus 120, the user may be annoyed by the frequently occurred notifications. In addition, the notifications fail to provide further information between the incoming images/videos.

Therefore, the control unit 143 is configured for classifying the metadata MD into different groups according to the information within the metadata MD. For example, the metadata MD can be classified by the location. When the captured locations of the metadata MD (the locations where the corresponding multimedia files are captured) are adjacent or the same, aforesaid metadata MD are classified into the same group. For example, the metadata MD can also be classified by the timestamp. When the captured timestamps of the metadata MD (the time when the corresponding multimedia files are captured) are adjacent, aforesaid metadata MD are classified into the same group. The captured locations and the captured timestamps can also be utilized in combination to classify the metadata MD. For example, only the metadata MD with the adjacent timestamp and adjacent location are classified into the same group.

As shown in FIG. 3, the metadata MD transmitted from the electronic apparatus 120 to the electronic apparatus 140 corresponding to totally 83 images and 10 videos from 2014/3/2 15:20 to 2014/3/4 12:40 captured at three different locations. In this embodiment, 30 images from the whole images/videos are classified into the first group G1 because the metadata MD of the 30 images include the adjacent timestamps from 2014/3/2 15:20 to 2014/3/2 18:35, and the adjacent locations around City Hall area. Furthermore, 15 images and 2 videos from the whole images/videos are classified into the second group G2 because the metadata MD of the 15 images and 2 videos include the adjacent timestamps from 2014 Mar. 2 18:40 to 2014 Mar. 2 21:10, and the adjacent locations around Wall St. area. In this case, the images/videos groups G1 and G2 have adjacent timestamps but different locations, such that the images/videos are classified into different groups G1 and G2.

Furthermore, 18 images from the whole images/videos are classified into the third group G3 because the metadata MD of the 18 images include the adjacent timestamps from 2014/3/2 21:30 to 2014/3/2 23:15, and the adjacent locations around Broadway area. Furthermore, 20 images and 8 videos from the whole images/videos are classified into the fourth group G4 because the metadata MD of the 20 images and 8 videos include the adjacent timestamps from 2014/3/3 8:10 to 2014/3/3 12:40, and the adjacent locations around Broadway area. In this case, the images/videos groups G3 and G4 have adjacent locations but different dates, such that the images/videos are classified into different groups G3 and G4. However, the rule of how to classify the metadata MD is not only limited to the timestamp and the location in aforesaid embodiment shown in FIG. 3.

As shown in FIG. 3, the notification NTF includes four groups G1~G4, and the user can easily know how many images/videos are captured in a specific time period and around a specific location area. The notification NTF can be refreshed and displayed periodically (e.g., every 10 minutes, every one hour, every one day, or every one week) and will not pop out every time the metadata MD are received.

In the embodiment shown in FIG. 1, the electronic apparatus 120 includes the wireless communication unit 124, and the electronic apparatus 140 includes the wireless communication unit 144. In some embodiment, the wireless communication units 124 and 144 are both Wi-Fi transceivers. The wireless communication units 124 and 144 are selectively turned on for establishing a second wireless connection WC2 between the electronic apparatuses 120 and 140 through the wireless communication units 124 and 144. The second wireless connection WC2 over Wi-Fi transceivers has a relatively larger bandwidth and a relatively faster transmission speed than the first wireless connection WC1. In general, the second wireless connection WC2 established by the wireless communication units 124 and 144 is suitable for transmitting a large file, e.g., a High-Definition image, a video file, an audio file, a RAW data captured by the camera unit 122. However, maintaining the second wireless connection WC2 consumes a lot of energy. Therefore, the second wireless connection WC2 between the electronic apparatuses 120 and 140 is disconnected in default case for power saving reason. For example, when the second wireless connection WC2 is required (faster speed and wide bandwidth), the electronic apparatus 140 sends a triggering signal TS over the first wireless connection WC1 to the electronic apparatus 120 for turning on the wireless communication units 124.

For example, when one the groups G1~G4 is selected by the user on the electronic apparatus 140, the electronic apparatus 140 sends a triggering signal TS to the electronic apparatus 120 over the first wireless connection WC1. In response to the triggering signal TS, the second wireless connection WC2 is established, such that the thumbnails of original contents OrigD of the multimedia files and/or original contents OrigD of the multimedia files within the selected group are transmitted from the electronic apparatus 120 to the electronic apparatus 140 via the second wireless connection WC2. The original contents OrigD include image files, video files or raw data generated by the camera unit 122.

In some other embodiments, the metadata MD may include thumbnails of the multimedia files. In this case, when one of the at least group is selected, the thumbnails from the metadata MD within the selected group are displayed on the display unit 142 of the electronic apparatus 140. Further in response to one of the thumbnails is selected, the original content OrigD of the multimedia file corresponding to the selected thumbnail is transmitted from the electronic apparatus 120 to the electronic apparatus 140 via the second wireless connection WC2.

Aforesaid embodiments explains the behaviors about the low-energy communication unit 121 and the low-energy communication unit 141 is wireless connected (i.e., the first wireless connection WC1 is existed) during the camera unit 122 is capturing the multimedia files. However, in some other cases, the user may bring the electronic apparatus 120 away from the electronic apparatus 140 for a long time (e.g., for two days or a week), the metadata MD collected by the control unit 123 is unable to be transmitted to the electronic apparatus 140. In this case, reference is further made to FIG. 2, which is a schematic diagram illustrating the electronic system 100 according to another embodiment of this disclosure.

When the electronic apparatus 120 is away from the electronic apparatus 140, and the first low-energy communication unit 121 and the second low-energy communication unit 141 is disconnected during the camera unit 122 is capturing the multimedia files, the control unit 123 is configured for generating metadata MD related to the multimedia files respectively, classifying the metadata MD into at least one group, and creating a group event GE corresponding to the at least one group.

In this case, the electronic apparatus 120 transmits the final result about the group event GE to the electronic apparatus 140 in response to the first wireless connection WC1 is reconnected (e.g., the electronic apparatus 120 is brought back around the electronic apparatus 140). The details of how to classify the metadata MD into at least one group are similar to aforesaid embodiment and not to be repeated again.

Figure 2:
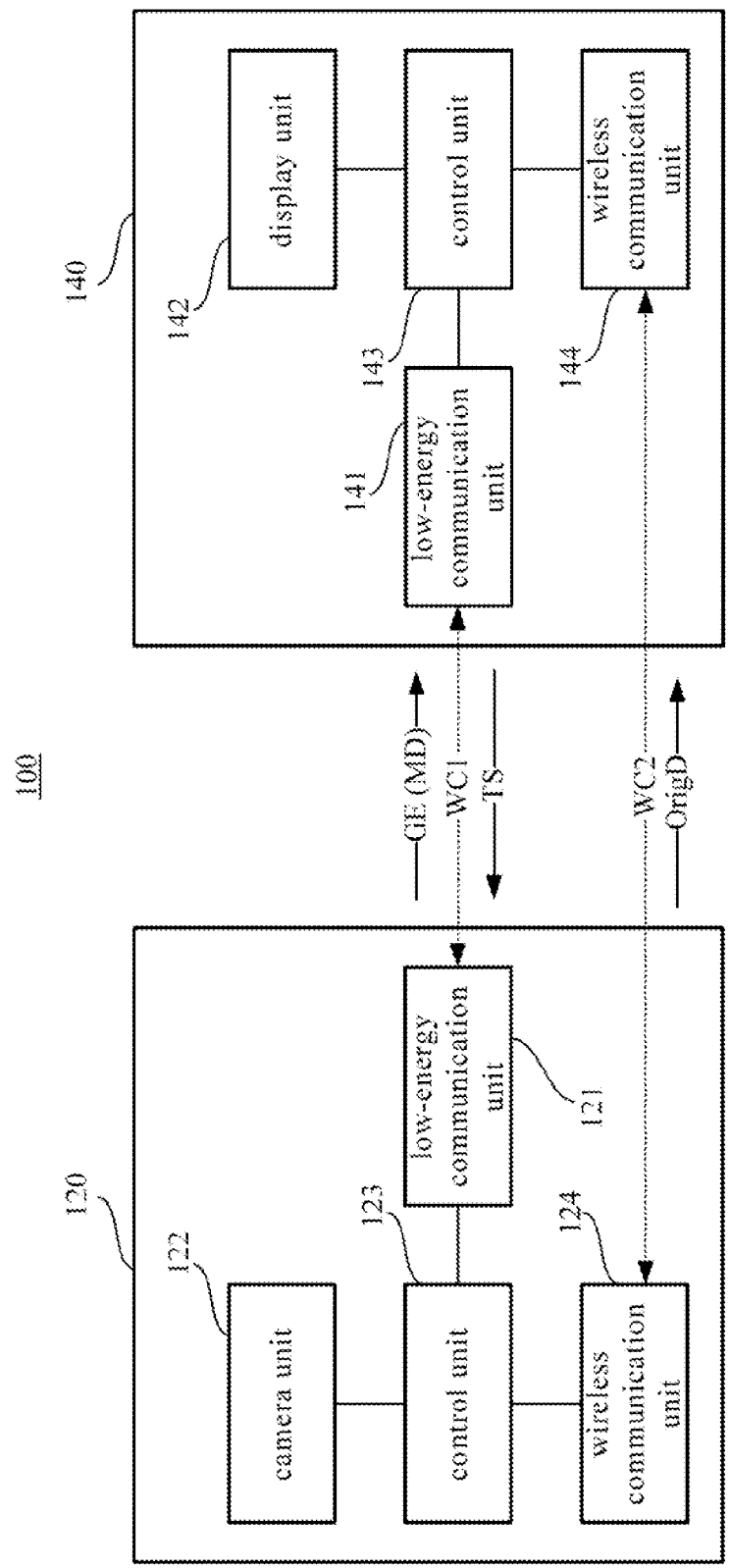
FIG. 2 is a schematic diagram illustrating an electronic system according to another embodiment of this disclosure.

In the embodiments shown in FIG. 2, when the low-energy communication unit 121 and the low-energy communication unit 141 is disconnected during the camera unit 122 is capturing the multimedia file, the control unit 123 of the electronic apparatus 120 is configured to complete the procedure of generating the metadata MD related to the multimedia files, classifying the metadata MD into at least one group (e.g., the groups G1~G4 as shown in FIG. 3), and creating the group event GE.

In this case, the electronic apparatus 140 receives the group event GE (the group event GE may include the metadata MD) without original contents OrigD of the multimedia file. The control unit 143 of the electronic apparatus 140 is configured to generate the notification (e.g., the notification NTF as shown in FIG. 3) describing the metadata group-by-group. The notification NTF includes a time period, a location region and a quantity of the multimedia files corresponding to each group.

In this document, the term "coupled" may also be termed as "electrically coupled", and the term "connected" may be termed as "electrically connected". "coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An electronic system, comprising:
   a first electronic apparatus, comprising:
      a first communication unit; and
      the first electronic apparatus, configured for capturing a plurality of multimedia files; and
      the first electronic apparatus, configured for generating a plurality of metadata related to the multimedia files respectively; and
   a second electronic apparatus, comprising:
      a second communication unit, configured for establishing a first wireless connection with the first communication unit, and receiving the metadata related to each of the multimedia files without receiving original contents of the multimedia files; and
      the second electronic apparatus, configured for classifying the metadata into at least one group;
   wherein the first electronic apparatus further comprises a first wireless communication unit, the second electronic apparatus further comprises a second wireless communication unit, the first and the second wireless communication units are selectively turned on for establishing a second wireless connection, the second wireless connection has a wider bandwidth and a faster transmission speed relative to the first wireless connection.

2. The electronic system of claim 1, wherein the metadata comprise captured locations corresponding to the multimedia files, the metadata with adjacent captured locations or the same captured location are classified into the same group.

3. The electronic system of claim 1, wherein the metadata comprise captured timestamps corresponding to the multimedia files, the metadata with adjacent captured timestamps are classified into the same group.

4. The electronic system of claim 1, wherein when the metadata are classified into the at least one group, the second electronic apparatus generates a notification describing the metadata group-by-group, the notification comprising at least one of a time period, a location region, a total file-size and a quantity of the multimedia files corresponding to each group of the metadata.

5. The electronic system of claim 4, wherein the metadata comprise thumbnails of the multimedia files, when the at least one group is selected, the thumbnails from the metadata corresponding to the selected group are displayed on the second electronic apparatus.

6. The electronic system of claim 1, wherein when the at least one group is selected, the original contents of the multimedia files corresponding to the selected group are transmitted from the first electronic apparatus to the second electronic apparatus via the second wireless connection, the original contents comprises an image file, a video file or raw data generated by the first electronic apparatus.

7. The electronic system of claim 1, wherein the metadata comprise thumbnails of the multimedia files, when the at least one group is selected, the thumbnails from the metadata corresponding to the selected group are displayed on the second electronic apparatus, and when one of the thumbnails is selected, the original content of the multimedia file corresponding to the selected thumbnail is transmitted from the first electronic apparatus to the second electronic apparatus via the second wireless connection, the original content comprises an image file, a video file or raw data generated by the first electronic apparatus.

8. An electronic system, comprising:
   a first electronic apparatus, comprising:
      a first communication unit; and
      the first electronic apparatus, configured for capturing a plurality of multimedia files; and
      the first electronic apparatus, configured for generating a plurality of metadata related to the multimedia files respectively, classifying the metadata into at least one group, and creating a group event corresponding to the at least one group; and
   a second electronic apparatus,
      configured for establishing a first wireless connection with the first communication unit, and receiving the group event comprising the metadata without original contents of the multimedia files; and
      the second electronic apparatus, configured for generating a notification according to the group event;
   wherein the first electronic apparatus further comprises a first wireless communication unit, the second electronic apparatus further comprises a second wireless communication unit, the first and the second wireless communication units are selectively turned on for establishing a second wireless connection, the second wireless connection has a wider bandwidth and a faster transmission speed relative to the first wireless connection.

9. The electronic system of claim 8, wherein the metadata comprise captured locations corresponding to the multimedia files, the metadata with adjacent captured locations or the same captured location are classified into the same group.

10. The electronic system of claim 8, wherein the metadata comprise captured timestamps corresponding to the multimedia files, the metadata with adjacent captured timestamps are classified into the same group.

11. The electronic system of claim 8, wherein when the group event comprising the metadata is received, the second electronic apparatus generates the notification describing the metadata group-by-group, the notification comprising at least one of a time period, a location region, a total file-size and a quantity of the multimedia files corresponding to each group of the metadata.

12. The electronic system of claim 11, wherein the metadata comprise thumbnails of the multimedia files, when the at least one group is selected, the thumbnails from the metadata corresponding to the selected group are displayed on the second electronic apparatus.

13. The electronic system of claim 8, wherein when the at least one group is selected, the original contents of the multimedia files corresponding to the selected group are transmitted from the first electronic apparatus to the second electronic apparatus via the second wireless connection, the original contents comprises an image file, a video file or raw data generated by the first electronic apparatus.

14. The electronic system of claim 8, wherein the metadata comprise thumbnails of the multimedia files, when the at least one group is selected, the thumbnails from the metadata corresponding to the selected group are displayed on the second electronic apparatus, and when one of the thumbnails is selected, the original content of the multimedia file corresponding to the selected thumbnail is transmitted from the first electronic apparatus to the second electronic apparatus via the second wireless connection, the original content comprises an image file, a video file or raw data generated by the first electronic apparatus.

15. An electronic system, communicatively connected with an external apparatus, the electronic system comprising:
   an electronic apparatus, comprising:
   a first wireless communication unit, configured for establishing a first wireless connection to the external apparatus; and
   the electronic apparatus, configured for capturing a plurality of multimedia files; and
   if the first wireless connection is connected during the electronic apparatus capturing the multimedia files, the electronic apparatus being configured for generating a plurality of metadata related to the multimedia files respectively and transmitting the metadata to the external apparatus without transmitting original contents of the multimedia files;
   wherein the electronic system further comprises a second wireless communication unit, the second wireless communication unit is selectively turned on for establishing a second wireless connection, the second wireless connection has a wider bandwidth and a faster transmission speed relative to the first wireless connection.

16. The electronic system of claim 15, wherein, if the first wireless connection is disconnected during the electronic apparatus capturing the multimedia files, the electronic apparatus is configured for generating a plurality of metadata related to the multimedia files respectively, classifying the metadata into at least one group, creating a group event corresponding to the at least one group and, when the first wireless connection is connected, transmitting the group event comprising metadata to the external apparatus without original contents of the multimedia files.

17. An electronic system, communicatively connected with an external apparatus, the electronic system comprising:
   a first electronic apparatus, comprising:
   a first wireless communication unit, configured for establishing a first wireless connection to the external apparatus, and receiving metadata or a group event from the external apparatus; and
   the first electronic apparatus, coupled with the first wireless communication unit, if the metadata or the group event from the external apparatus is received, the first electronic apparatus being configured for generating a notification according to the metadata or the group event;
   wherein the electronic system further comprises a second wireless communication unit, the second wireless communication unit is selectively turned on for establishing a second wireless connection, the second wireless connection has a wider bandwidth and a faster transmission speed relative to the first wireless connection.

18. The electronic system of claim 17, wherein the group event comprises the metadata, if the group event from the external apparatus is received, a second electronic apparatus generates the notification describing the metadata group-by-group, the notification comprising a time period, a location region, a total file-size and a quantity of the multimedia files corresponding to each group of the metadata.

* * * * *